J. F. FERRY.
CLIP DEVICE OR FASTENER.
APPLICATION FILED MAY 18, 1917.
1,247,099.
Patented Nov. 20, 1917.
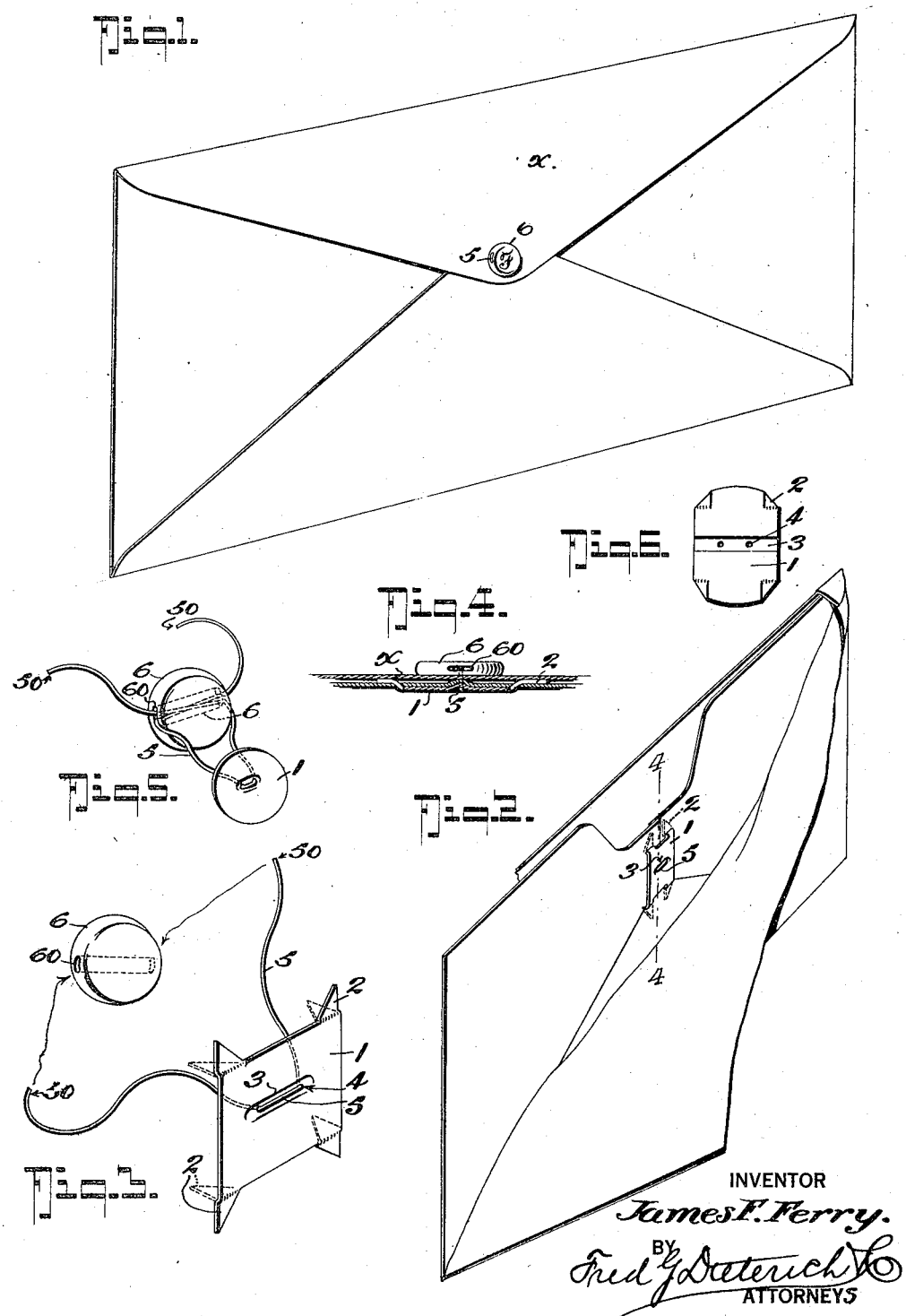
INVENTOR
James F. Ferry.
BY
Fred G. Dieterich
ATTORNEYS

UNITED STATES PATENT OFFICE.

JAMES FRANCIS FERRY, OF LEADVILLE, COLORADO.

CLIP DEVICE OR FASTENER.

1,247,099.  Specification of Letters Patent.  Patented Nov. 20, 1917.

Application filed May 18, 1917. Serial No. 169,565.

*To all whom it may concern:*

Be it known that I, JAMES F. FERRY, a citizen of the United States, residing at Leadville, in the county of Lake and State of Colorado, have invented a new and Improved Clip Device or Fastener, of which the following is a specification.

My invention has reference to improvements in metal clasps or clip-like fasteners that are more especially designed for being used in connection with envelops, legal or other papers, and packages, and which, when operatively applied, is of neat appearance and is adapted for effectively serving its intended purpose.

In its general characteristics, my invention embodies a specially formed body member that is shaped up from suitable material, preferably a thin metal blank and is provided with suitably arranged prongs or clips, whereby it may be readily secured upon the back part of an envelop or binder member of legal papers and the like.

My present invention also includes, in a clip device or fastener of the character stated, a peculiar arrangement of a body member having means for attaching it to the side portions and the bottom flap of the envelop, and especially adapted to serve as a means for holding a flexible closure or binder member, such as a thin flexible wire loop, the ends of which are pointed for being passed through the back and the closure flap members of the envelop for coöperating with a sealing button or disk designed for interlockably receiving and holding the ends of the said flexible loop.

With other objects in view, that will later appear, my invention consists in the peculiar features of construction and novel arrangement of the parts hereinafter fully explained, specifically pointed out in the appended claims and illustrated in the accompanying drawings, in which:

Figure 1 is a perspective view of an envelop to which one of my clip or fastener devices is attached.

Fig. 2 is a similar view, the sealing flap being shown as torn off the envelop front and the latter as bent outwardly to better illustrate the manner in which the fastener device is secured.

Fig. 3 is a perspective view of my improved clip or fastener device, the ends of the binder loop and the sealing member being shown separated.

Fig. 4 is a horizontal section of the clip or fastener device taken substantially on the line 4—4 on Fig. 2.

Figs. 5 and 6 are detail views that illustrate modified forms of my invention hereinafter specifically referred to.

My improved clip device or fastener comprises a body or head portion 1, preferably of rectangular or square shape and in practice the said body is shaped up from a thin sheet metal blank having an angled prong or clip 2 extended from each corner thereof.

The body 1 is also formed with a transverse groove or channel 3 in the outer face, within the length of which the said body has two closely arranged apertures 4—4, see Fig. 3, the purpose of which will be presently explained.

5 designates, what I term, the binder and it consists of a thin flexible wire that is bent into a loop, which, when operatively applied, has its free ends 50 threaded through the apertures 4—4 in the body member 1.

6 denotes a sealing button, preferably of soft metal, that is formed with an opening 60 which extends from one edge through the other edge, as is clearly shown in Fig. 3.

In the practical application of my clip or fastener device, when it is desired to apply it for sealing an envelop, as indicated in Fig. 1, the corner prongs on the head 1 are turned inwardly at right angles to the body part and the binder loop has its ends passed through the apertures 4—4 in the said body part 1. The two ends of the binder wire are then brought together, pushed through the back of the envelop and pulled upon until the body member 1 is drawn up against the inside of the said envelop back. By applying pressure on the body member 1, the prongs 2—2 are caused to penetrate through the envelop back and in position for being readily bent out over the back face of the envelop, as is clearly indicated in Figs. 2 and 4.

The ends of the binder wire are then held together and threaded from the inside through the envelop closing flap $x$, after which the said binder wire ends are separated and passed, in reverse direction, through the single aperture 60 in the sealing button 6 and drawn up until the said button 6 comes up tightly against the said flap $x$ to hold the said flap to the closed position.

To keep the button 6 up to its flap closure position, the said wire ends are cut off after the head has been hammered down so as to hold the wires secure therein.

While I prefer to make the head or body member 1 with angled prongs or clips for positively clipping the head onto the envelop or other object to which it may be applied, the said head may be made without the said prongs, as is clearly shown in the modified form Fig. 5.

In Fig. 6 is shown a further modification of my clipping device and, in this form, the clips or prongs do not extend diagonally from the four corners of the head 1 but instead each pair of the said clips or prongs, at each end, is arranged for being bent in parallelism at right angles to the said body 1.

In this latter form, the transverse groove 3 extends entirely across the head instead of but part way, as is shown in Figs. 1 and 3.

From the foregoing taken in connection with the drawings, the complete arrangement, the manner of operation and the advantages of my present invention will be readily understood.

By forming the head with fastening clips and with a pair of apertures located in a channel or grooved part of the said head, combined with a flexible binder, the loop end of which rests in the channel or groove 3 in the head, when the fastener is operatively applied, the said loop end of the binder wire is so set that it will not cut or tear the contents of the envelop.

While I have described and shown my fastener or clip device as especially adapted for use in connection with envelops, I desire it understood that it may be readily applied for securing papers or other like instruments for which clip fasteners are usually provided.

What I claim is:

1. As a new article, a device of the character stated comprising a flat head, a loop binder wire attached thereto and adapted for threading through the back and the closure flap of an envelop, and means for securing the ends of the binder wire over the outside of the said closure flap.

2. As a new article, a device of the character stated comprising a flat head, a loop binder wire attached thereto and adapted for threading through the back and the closure flap of an envelop, and means for securing the ends of the binder wire over the outside of the said closure flap, the said means comprising a soft metal sealing button having an aperture that extends from one edge through the other edge for receiving the two ends of the binder wire.

3. As a new article, a device of the character stated comprising a flat head, the said head having a pair of apertures, a loop binder wire whose ends are adapted to be threaded through the apertures in the head, the envelop back and the closure flap and means for securing the ends of the binder wire against the outside of the closure flap.

4. As a new article, a device of the character stated comprising a flat head having a transverse groove in one face and a pair of apertures within the limits of the said groove, a looped flexible binder wire whose ends are adapted to thread through the said head and drawn up whereby to seat the loop portion of the said binder wire within the groove in the flat head, and a sealing button having a transverse passage that extends from one edge through the other edge, the said passage forming a threading aperture for the free ends of the flexible wire binder.

5. As a new article, a device of the character stated comprising a flat head having a bendable prong at each corner, a loop binder wire attached thereto and adapted for threading through the back and the closure flap of an envelop and means for securing the ends of the binder wire over the outside of the closure flap.

JAMES FRANCIS FERRY.